United States Patent [19]
Heidelberg

[11] Patent Number: 5,299,913
[45] Date of Patent: Apr. 5, 1994

[54] WIND POWER PLANT

[76] Inventor: Götz Heidelberg, Am Hügel 16, W-8136 Starnberg-Percha, Fed. Rep. of Germany

[21] Appl. No.: 867,236
[22] PCT Filed: Nov. 30, 1990
[86] PCT No.: PCT/EP90/02060
§ 371 Date: Jul. 9, 1992
§ 102(e) Date: Jul. 9, 1992
[87] PCT Pub. No.: WO91/08394
PCT Pub. Date: Jun. 13, 1991

[30] Foreign Application Priority Data
Dec. 1, 1989 [DE] Fed. Rep. of Germany ....... 3939862

[51] Int. Cl.5 .............................. F03D 3/00
[52] U.S. Cl. .................... 416/197 A; 290/55; 416/119; 416/204 R; 416/211; 416/DIG. 6
[58] Field of Search ............. 290/55; 415/2.1, 4.2, 415/4.4; 416/119, 197 A, 204 R, 210 R, 211, DIG. 4, DIG. 6

[56] References Cited
U.S. PATENT DOCUMENTS

| | | | |
|---|---|---|---|
| 1,917,655 | 7/1933 | Leash | 416/DIG. 6 |
| 3,473,038 | 10/1969 | Hakkarinen | 414/DIG. 4 |
| 4,130,380 | 12/1978 | Kaiser | 416/197 A |
| 4,285,636 | 8/1981 | Kato et al. | 416/197 A |
| 4,970,404 | 11/1990 | Barger | 416/197 A |
| 4,979,871 | 12/1990 | Reiner | 416/119 X |

FOREIGN PATENT DOCUMENTS

| | | |
|---|---|---|
| 74938 | 3/1983 | European Pat. Off. |
| 3629872 | 3/1988 | Fed. Rep. of Germany |
| 3721383 | 6/1988 | Fed. Rep. of Germany |
| 3810339 | 10/1989 | Fed. Rep. of Germany |
| 332379 | 10/1903 | France |
| 730384 | 8/1932 | France |
| 1455035 | 1/1989 | U.S.S.R. ................. 290/55 |
| 1546700 | 2/1990 | U.S.S.R. ................. 290/55 |

Primary Examiner—Edward K. Look
Assistant Examiner—Mchael S. Lee
Attorney, Agent, or Firm—Spencer, Frank & Schneider

[57] ABSTRACT

A wind power plant for harnessing wind power includes a tower; a plurality of upright rotor blades spaced apart circumferentially and spaced radially from a rotational axis; and a supporting structure for the rotor blades leading from the tower to the rotor blades.

24 Claims, 3 Drawing Sheets 5,299,913

WIND POWER PLANT

BACKGROUND OF THE INVENTION

This invention relates to a wind power plant having a plurality of rotor blades.

The presumably most widespread kind of wind power plant used today has a rotor with a horizontal axis in the manner of an airplane propeller and a customary electric power generator that is driven by the rotor via a gearing.

SUMMARY OF THE INVENTION

It is an object of the invention to provide an improved wind power plant of the above-outlined type in which the rotor blades are loaded less and are therefore longer-lasting or can have a simpler design, in particular because no combined load resulting from centrifugal force and wind power acting in two directions is concentrated and attacks only one place, the root of the rotor blade. This results in favorable preconditions for building inventive wind power plants having high power and also for utilizing high wind velocities.

It is a further object of the invention to simplify and reduce the price of the supporting structure for the rotor blades. A lightweight and simply produced supporting structure contributes to a substantial price reduction in the overall wind power plant.

These objects and others to become apparent as the specification progresses, are accomplished by the invention, according to which, briefly stated, the wind power plant has a tower; a plurality of upright rotor blades which are circumferentially spaced apart and which are radially spaced from a rotational axis; and a supporting structure for the rotor blades extending from the tower to the rotor blades.

In a preferred embodiment the supporting structure and the rotor blades form a common rigid unit that can be mounted on the tower with only one bearing or with only two bearings. The outer area of the supporting structure preferably comprises substantially a number of circumferentially distributed, substantially tetrahedral elements, each having four struts, a tangential strut or a circumferential portion of the inner area and a central portion of the rotor blade in question.

The inventive wind power plant can be realized in two different designs, namely with a stationary tower about which the supporting structure, the rotor blades and optionally the supporting structure bracing cables or struts rotate under the action of the wind, and with a rotatable central tower to which the supporting structure the rotor blades and optionally the supporting structure bracing cables or struts are firmly connected. In the latter case the bracing cables or inclined supports for the tower, if any, are favorably connected to the central tower in such a way that the central tower can rotate relative to them. The tower can be replaced, in particular in a lower area but also altogether, by a number of downwardly diverging supports.

According to a preferred embodiment the wind power plant is designed for generating electric power. The arrangement for converting the rotary motion of the rotor blades into electric energy differs fundamentally from a customary generator by the very much larger diameter of the ring-shaped air gap. There is no generator constituting a separate expensive machine. The functional parts of the converting arrangement, that is, the rotor and stator structures are instead integrated into the steel structure of the wind power plant. The tolerances are clearly greater than in customary generators. From this point of view as well it is favorable to design the converting arrangements with an exciter system constructed with permanent magnets, preferably highly coercive permanent magnets, for example on the basis of elements of the rare earths with cobalt or on an iron-neodymium base or with cheaper ferrite permanent magnets. With such permanent magnets one can realize a relatively thick air gap. Also, such magnets react only little to air gap variations induced for example by the abovementioned greater tolerances. Such a converting arrangements could be called a "ring generator" or "long stator generator"; it is more like a linear generator than a customary electric power generator. The exciter system is preferably assigned to the rotatable functional part because it is less complicated to conduct the generated current from the other, stationary functional part.

The "large diameter" of the air gap or the two supporting rings can be best characterized more precisely in relation to the arrangement diameter of the rotor blades; values of more than 12%, preferably more than 20%, air gap diameter in relation to the arrangement diameter of the rotor blades are preferred.

According to further features of the invention, the wind power plant is particularly adapted to be erected and supported on the ocean floor. It is favorable if one need not first build foundation-like structures in the ocean floor on which the wind power plant will rest, but instead equips the wind power plant with one or more foundation bodies that rest on the ocean floor. The term "rest" is intended to include a limited sinking into the uppermost layer of the ocean floor. Obviously, the foundation body or bodies jointly have a resting area large enough to carry off the weight of the wind power plant into the ocean floor. The stability of the wind power plant even under the highest wind velocities that occur results from its own weight.

To make it as simple as possible to erect the wind power plant on the ocean floor it is favorable to design the foundation body or bodies as fillable floating bodies. These can in particular be either floating bodies open at the top that can be simply filled with sand, stones or water from above, or hollow bodies that can be flooded. In the latter case the hollow bodies can either be provided in the interior with a pump or with a connection for external pumping so that they can be emptied and made to float if required. The floating bodies can be so large that they can keep the wind power plant floating in the unfilled state.

The number of rotor blades is preferably in the range of two to six, the odd numbers three and five being particularly preferred. The rotor blades need not necessarily be disposed on a common arrangement circle, although this is preferred. The term "upright" used in the application does not necessarily mean "vertical", although this is preferred; slightly inclined positions are tolerable, which may very well result if the wind power plant is erected on the ocean floor in particular if one or another foundation body sinks in slightly. When "horizontal plane" or "plane perpendicular to the axis of the tower" is spoken of this does not necessarily mean that the described components lie exactly in one plane; it refers to the general arrangement alignment of the described components. Wind power plants are frequently built with a possibility of controlling the angle of attack of the rotor blades relative to their arrangement circle. This can also be provided in the inventive wind power plant; however, a design without such incidence control is preferred in particular in the interests of simplifying the construction as much as possible. It can be necessary to ensure a possibility of setting the rotor blades rotating by a drive for starting in the known way, in particular by means of the described generator. The wind power plant is not only suitable for generating electric power, although this is the preferred field of application according to the invention. Alternatively the wind power plant can also be used in particular to drive machines such as pumps or compressors.

DESCRIPTION OF THE PREFERRED EMBODIMENTS

Figure 1:
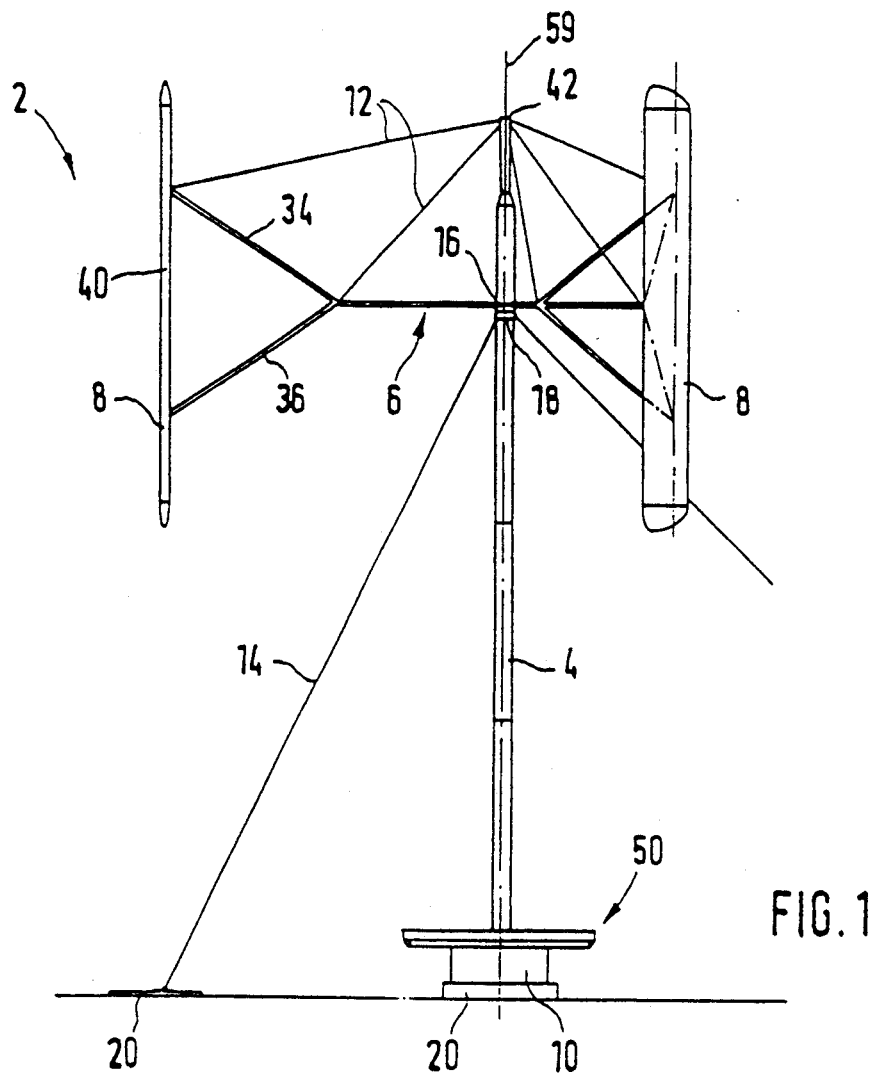
FIG. 1 shows a wind power plant erected on land with a rotatable tower from the side.

Wind power plant 2 shown in FIG. 1 comprises substantially a vertical, rotatable tower 4, a supporting structure 6 that is—very roughly speaking—horizontally aligned, three upright rotor blades 8 (only two are visible) fastened radially on the outside of supporting structure 6, a mounting base 10 for tower 4, supporting structure bracing cables 12, tower bracing cables 14, and a converting means 50 for converting the rotary motion of rotor blades 8 or supporting structure 6 or tower 4 into electric energy.

Tower 4 is designed as a steel pipe with the diameter necessary in terms of load and the wall thickness necessary in terms of load. Supporting structure 6 is fastened to tower 4 at a place located somewhat below the top of the tower. Rather close below this fastening point 16 a stationary collar 18 is seated on the outer circumference of tower 4 by means of a rolling bearing (not shown). Three tower bracing cables 14 (only one shown in its entirety) lead from the collar obliquely outward and downward to a ground foundation 20 in each case. Mounting base 10 is likewise seated on a ground foundation 20. The lower end of tower 4 is mounted on mounting base 10 by means of a rolling bearing (not shown), preferably a rolling bearing permitting slightly inclined positions of tower 4, such as a spherical roller bearing.

Figure 2:
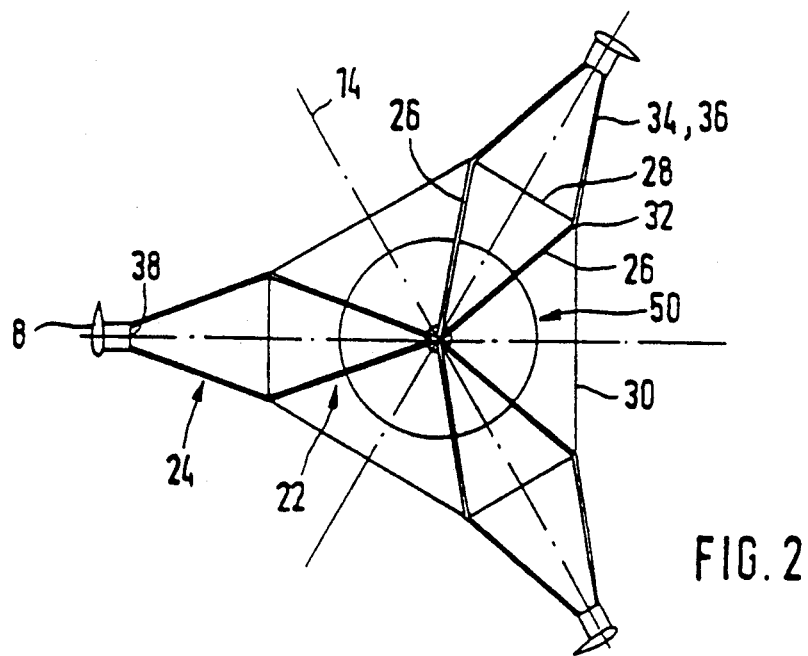
FIG. 2 shows a top view of the supporting structure of the wind power plant according to FIG. 1.

Also referring to FIG. 2, the supporting structure has a radially inner area 22 and a radially outer area 24. Inner area 22 comprises substantially three pairs of struts 26 and three tangential struts 28. Each pair of struts 26 with associated tangential strut 28 has the configuration of an equilateral triangle lying in a horizontal plane with a radially inner vertex. Bracing cables 30 are provided between each two adjacent "triangles". The bracing cables are connected to each junction point between a strut 26 and a tangential strut 28.

An upper strut 34 leads outwardly and upwardly from each of the described junction points 32 and a lower strut 36 outwardly and downwardly. The two upper struts 34, that are associated with one of described "triangles" 26, 28, converge radially on the outside. The same applies to each two lower struts 36. In this way each rotor blade 8 is carried by four struts 34 and 36, whereby convergence points 38 of upper struts 34 or lower struts 36 are located close to rotor blade 8 in question. Altogether the two upper struts 34 and two lower struts 36 associated with the rotor blade in question, tangential strut 28 in question and a central portion 40 of rotor blade 8 in question form a tetrahedron. The altogether six upper struts 34 and the altogether six lower struts 36 form together outer area 24 of supporting structure 6, whereby the described tetrahedrons are spaced apart in the circumferential direction of supporting structure 6, as FIG. 2 shows particularly clearly.

On the radial inside bracing cables 12 are all fastened to a fastening ring 42 associated with tower 4. Altogether six lower bracing cables lead from fastening ring 42 obliquely outward and downward to described junction points 32 of inner area 22 of supporting structure 6. Altogether three upper bracing cables lead from fastening ring 42 obliquely downward and outward to described convergence points 38 of upper struts 34. Upper struts 34 and lower struts 36 lie symmetrically to a plane that can be imagined as a continuation of the plane of inner area 22 of supporting structure 6.

Abovementioned converting means 50 is specifically constructed as described in more detail below in connection with the embodiment according to FIG. 4.

Figure 3:
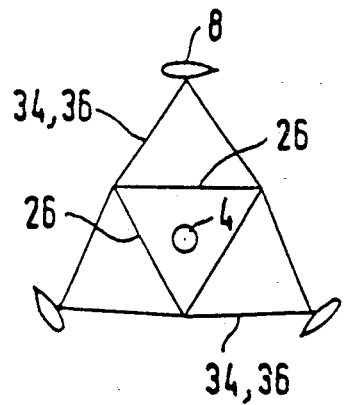
FIG. 3 shows a top view of a modified supporting structure of the wind power plant of FIG. 1.

The variant of the supporting structure shown in FIG. 3 differs from the variant shown in FIGS. 1 and 2 substantially in that the adjacent "triangles" of inner area 22 are moved together in the circumferential direction so that altogether only three symmetrically distributed struts 26 are present and no bracing cables 30 are present. Outer area 24 has not changed fundamentally. Accordingly only three lower bracing cables 12 are present. This variant is particularly suitable for wind power plants 2 with lower power in which the arrangement diameter of rotor blades 8 is smaller than in the variant according to FIGS. 1 and 2.

Figure 4:
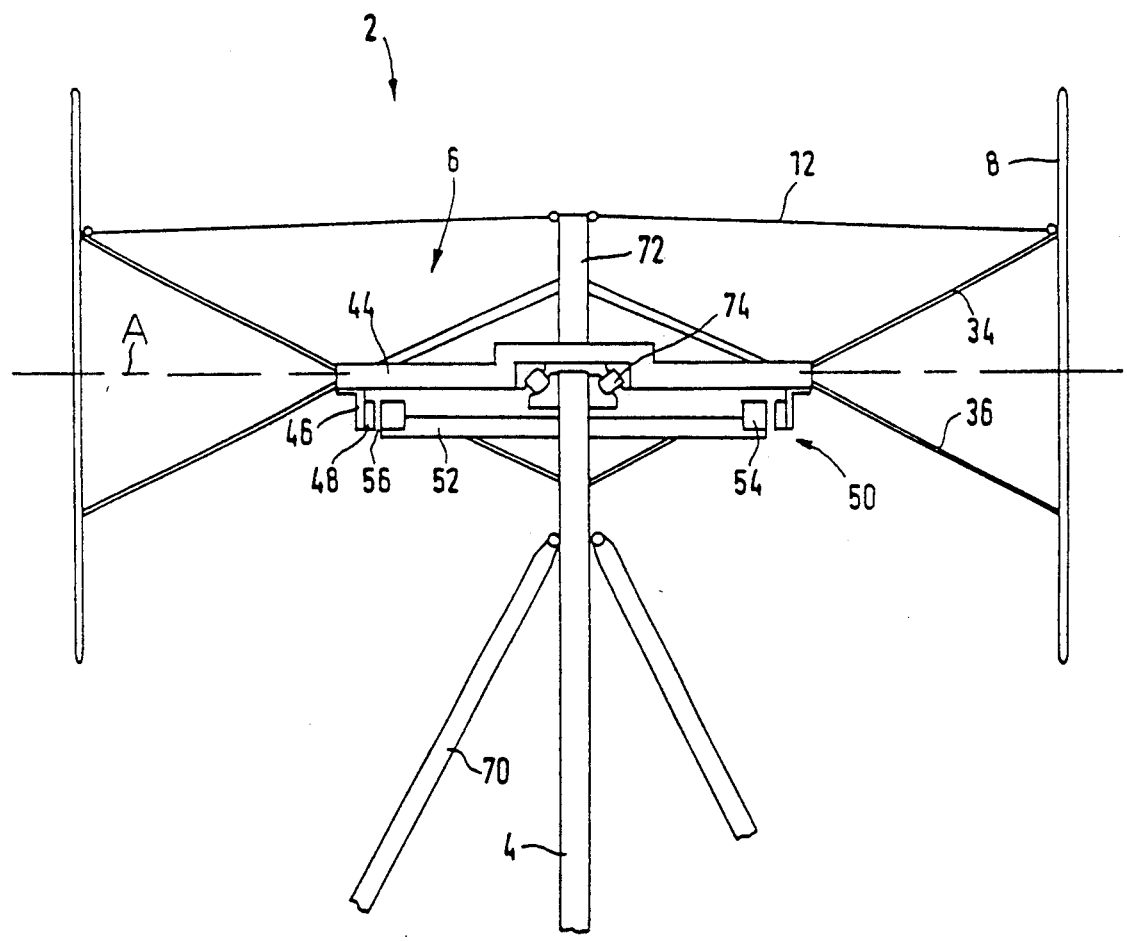
FIG. 4 shows a second embodiment of a wind power plant with an unrotatable tower in a partial side view.

The embodiment shown in FIG. 4 differs from the above described embodiments substantially by the following features.

Tower 4 is designed as an unrotatable tower. It is supported by two inclined supports 70 that form with each other an angle of preferably 100° to 150° in a top view. Inclined supports 70 are pivoted to tower 4.

Inner area 22 is formed substantially by a supporting ring 44 with radial spokes (not shown). The "tetrahedrons" of outer area 24 are fastened to this supporting ring 44, being substantially designed as described with reference to FIGS. 1 and 2 although a circumferential portion of supporting ring 44 performs the function of a tangential strut 28.

A number of permanent magnets 48 with alternating polarity in the circumferential direction are fastened to supporting ring 44 on a downwardly protruding collar 46 along its inner circumference.

Supporting ring 44 is united with a central, upwardly protruding pipe 72. The union of supporting ring 44 and pipe (shaft) 72 is mounted rotatably on tower 4 in the area of the top of the tower by means of a collar step bearing 74. Rolling bearing 74 is designed in such a way as to prevent angular motions of supporting ring 44 relative to tower 4. Instead of one bearing 74, two bearings one above the other can also be provided. Three bracing cables 12 lead from the tip of pipe 72 to described points 38.

Just below supporting ring 44 a further supporting ring 52 is fastened to tower 4 and extending substantially in a horizontal plane. A laminated stator 54 is fastened along the outer circumference of further supporting ring 52, said stator having in its radially outer circumferential surface perpendicular grooves in which coils or windings of a conductor system (not shown) are incorporated. Between the outer circumferential surface of stator 54 and the inner circumferential surface of row of permanent magnets 48 there is a vertically cylindrical air gap 56. Stator 54 thus forms a first functional part of a converting means (electric generator) 50, and a row of permanent magnets 48 a second functional part thereof. Obviously, magnetic flux paths must be ensured between adjacent stator poles or permanent magnet poles both on stator 54 and on the rotor assembly 44, 46, 48. The converting means 50 and the bearing 74 are situated generally at the same height level; they are arranged, as may be observed in FIG. 4, substantially in a horizontal plane A which halves the rotor blades 8 in their length. The supporting ring 44 too, is arranged in the plane A.

Upon rotation of supporting structure 6 or supporting ring 44 about the axis of tower 59 a voltage is induced in the coils or windings of stator 54 by permanent magnets 48 moving along stator 54. The diameter of air gap 56 is more than 20% the arrangement diameter of rotor blades 8.

It is favorable to provide only two inclined supports 70 to facilitate the erection of tower 4 with the aid of a steel cable from the ground without necessarily requiring a crane.

Tower 4 transmits the supporting torque for keeping stator 54 from rotating to the ground without inclined supports 70 being loaded by this torque.

Figure 5:
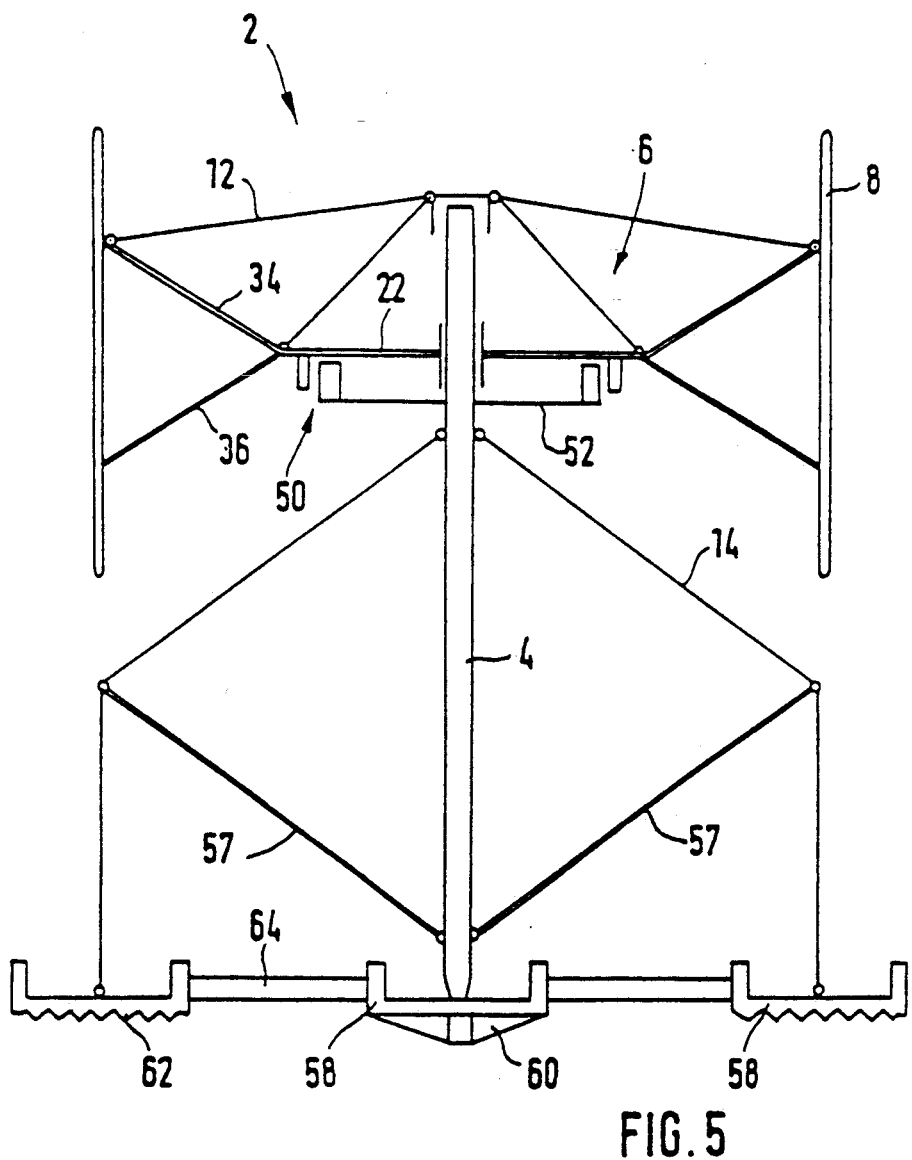
FIG. 5 shows a third embodiment of a wind power plant for erection on the ocean floor from the side, one of the three rotor blades and one of the three outer foundation bodies being rotated into the plane of projection.

The embodiment of a wind power plant 2 shown in FIG. 5 differs from the above described embodiments substantially by the following features.

Supporting structure 6 and fastening ring 42 for supporting structure bracing cables 12 are mounted rotatably on stationary tower 4 by means of rolling bearings (not shown). From the lower end area of tower 4 three spacing struts 57 each lead obliquely outward and upward to one of tower bracing cables 14 so that their lower sections extend substantially vertically.

A hollow foundation body 58 open at the top is provided for the lower end of the tower and for the lower ends of tower bracing cables 14 in each case. Central foundation body 58 has on its underside vertical plate extensions 60 with which it can securely dig its way into the ocean floor to a certain extent. Outer foundation bodies 58 have a profiled underside 62 so that they will not perform any undesirable lateral motions on the ocean floor. Foundation bodies 58 are preferably circular and preferably have a diameter that is at least two to four times their height. The figure also indicates a frame 64 that interconnects the three outer foundation bodies 58 in a triangular shape.

Converting means 50 is designed similarly to that described in more detail with reference to FIG. 4.

It is pointed out in general that struts similar to described cables 12, 30, 14 can also be provided.

It is also pointed out that the components described in connection with the embodiments shown can also be combined with each other in ways different from the one shown. For example it is also possible to design the variant with a rotatable tower 4 with foundation bodies 58 for erection on the ocean floor, whereby converting means 50 must of course be disposed a sufficient distance above sea level. Conversely, one can provide the variant according to FIG. 5 to be erected on land. Spacing struts 56 can be provided in all variants but are particularly favorable in the variant for erection on the ocean floor. If bracing cables 14 are present it is favorable to equip at least one of bracing cables 14 with a means for changing or adjusting their length, in particular if the plant is erected on the ocean floor in which case one must expect outer foundation bodies 58 to sink into the ocean floor to varying degrees.

I claim:

1. A wind power plant for harnessing wind power, comprising
   (a) a tower;
   (b) an upright shaft supported by said tower;
   (c) a supporting structure disposed on the shaft for rotation about an upright rotary axis; said supporting structure including a rotary supporting ring;
   (d) a plurality of upright elongate rotor blades mounted on said supporting structure; said rotor blades being spaced circumferentially from one another and radially from said upright rotary axis;
   (e) a bearing mounted on said shaft and having a bearing axis coinciding with said upright rotary axis; said supporting structure surrounding said bearing and being supported thereby on said shaft; said bearing being situated at a height level which substantially corresponds to a height level of a horizontal plane halving the rotor blades;
   (f) a stationary supporting ring generally coaxially surrounding said upright rotary axis; and
   (g) energy conversion means for converting a rotary motion of said rotor blades into electric energy; said energy conversion means being situated at a height level which substantially corresponds to the height level of said horizontal plane halving the rotor blades; said energy conversion means including
      (1) a first, stationary functional part mounted on said stationary supporting ring;
      (2) a second, rotary functional part mounted on said rotary supporting ring;
      (3) an air gap defined between said first and second functional parts;
      (4) an exciter system carried by one of said first and second functional parts; and
      (5) a conductor system carried by another of said first and second functional parts.

2. The wind power plant as defined in claim 1, wherein said exciter system comprises a plurality of circumferentially distributed permanent magnets.

3. The wind power plant as defined in claim 1, further wherein at least a length portion of said upright shaft is rotatable about said upright rotary axis relative to said tower; further comprising cables connecting said supporting structure with said length portion of said upright shaft.

4. The wind power plant as defined in claim 1, wherein said rotary support ring surrounds an inner area of said supporting structure; said inner area lying in a plane substantially perpendicular to said upright rotary axis.

5. The wind power plant as defined in claim 1, wherein the rotor blades have an arrangement diameter;

said air gap having a diameter which is greater than 20% of the arrangement diameter.

6. The wind power plant as defined in claim 1, wherein said supporting structure is situated at a height level substantially corresponding to the height level of the horizontal plane halving the rotor blades.

7. The wind power plant as defined in claim 1, further wherein at least a length portion of said upright shaft is rotatable about said upright rotary axis relative to said tower; further comprising struts connecting said supporting structure with said length portion of said upright shaft.

8. The wind power plant as defined in claim 1, wherein said supporting structure further comprises a separate strut assembly for each rotor blade; each strut assembly comprising two upper struts each having an end secured to said rotary supporting ring and extending obliquely upwardly and away from said rotary supporting ring; said upper struts being convergent and each having an end secured to an upper portion of the respective rotor blade; each strut assembly further comprising two lower struts each having an end secured to said rotary supporting ring and extending obliquely downwardly and away from said rotary supporting ring; said lower struts being convergent and each having an end secured to a lower portion of the respective rotor blade; and said rotary supporting ring being at a height level which substantially corresponds to the height level of the horizontal plane halving the rotor blades.

9. The wind power plant as defined in claim 8, wherein the upper struts are disposed substantially symmetrically to the lower struts relative to a horizontal plane.

10. The wind power plant as defined in claim 1, further comprising inclined supports supporting said tower on the ground.

11. The wind power plant as defined in claim 10, further comprising a foundation body at lower ends of said inclined supports for supporting the tower on a sea floor.

12. The wind power plant as defined in claim 11, wherein said foundation body is a filled floating body sunken onto the sea floor.

13. The wind power plant as defined in claim 11, wherein said foundation body has a profiled underside for preventing lateral displacements thereof on the sea floor.

14. The wind power plant as defined in claim 1, wherein the rotor blades have an arrangement diameter; said air gap having a diameter which is greater than 12% of the arrangement diameter.

15. The wind power plant as defined in claim 14, wherein said tower is unrotatable and further wherein said stationary supporting ring is affixed to said tower above said supporting structure in the vicinity thereof.

16. The wind power plant as defined in claim 14, wherein said tower is unrotatable and further wherein said stationary supporting ring is affixed to said tower below said supporting structure in the vicinity thereof.

17. The wind power plant as defined in claim 1, further comprising a foundation body at a lower end of said tower for supporting the tower on a sea floor.

18. The wind power plant as defined in claim 17, wherein said foundation body has a profiled underside for preventing lateral displacements thereof on the sea floor.

19. The wind power plant as defined in claim 17, wherein said foundation body is a filled floating body sunken onto the sea floor.

20. The wind power plant as defined in claim 1, further comprising bracing cables bracing the tower on the ground.

21. The wind power plant as defined in claim 20, further comprising a separate spacing strut connected to said tower and a respective said bracing cable between opposite ends thereof; each bracing cable extending substantially vertically from the spacing strut to the ground.

22. The wind power plant as defined in claim 20, further comprising a foundation body at lower ends of said bracing cables for supporting the tower on a sea floor.

23. The wind power plant as defined in claim 22, wherein said foundation body has a profiled underside for preventing lateral displacements thereof on the sea floor.

24. The wind power plant as defined in claim 22, wherein said foundation body is a filled floating body sunken onto the sea floor.

* * * * *